US011381874B2

(12) United States Patent
Richman

(10) Patent No.: US 11,381,874 B2
(45) Date of Patent: Jul. 5, 2022

(54) PERSONALIZATION OF CURATED OFFERINGS OF MEDIA APPLICATIONS

(71) Applicant: SONY CORPORATION, Tokyo (JP)

(72) Inventor: Steven Richman, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/752,790

(22) Filed: Jan. 27, 2020

(65) Prior Publication Data

US 2021/0235156 A1 Jul. 29, 2021

(51) Int. Cl.
| | | |
|---|---|---|
| *H04N 21/431* | (2011.01) | |
| *H04N 21/443* | (2011.01) | |
| *H04N 21/478* | (2011.01) | |
| *H04N 21/485* | (2011.01) | |
| *G06F 3/04817* | (2022.01) | |
| *G06F 3/04842* | (2022.01) | |
| *G06F 3/0484* | (2022.01) | |
| *G06F 3/0482* | (2013.01) | |

(52) U.S. Cl.
CPC ....... *H04N 21/4438* (2013.01); *G06F 3/0482* (2013.01); *G06F 3/0484* (2013.01); *H04N 21/4316* (2013.01); *H04N 21/478* (2013.01); *H04N 21/485* (2013.01)

(58) Field of Classification Search
CPC ........... H04N 21/4438; H04N 21/4316; H04N 21/478; H04N 21/485
See application file for complete search history.

(56) References Cited

U.S. PATENT DOCUMENTS

| | | | |
|---|---|---|---|
| 7,703,116 B1 * | 4/2010 | Moreau | H04N 21/482 |
| | | | 725/45 |
| 2006/0259613 A1 * | 11/2006 | Othmer | H04L 67/22 |
| | | | 709/224 |
| 2012/0173339 A1 | 7/2012 | Flynt et al. | |
| 2015/0074721 A1 * | 3/2015 | Fishman | H04N 21/47205 |
| | | | 725/45 |
| 2016/0037207 A1 | 2/2016 | Soto et al. | |
| 2019/0149857 A1 * | 5/2019 | Lo | H04N 21/43074 |
| | | | 709/219 |
| 2019/0349619 A1 * | 11/2019 | Hou | H04N 21/251 |
| 2020/0389701 A1 * | 12/2020 | Hoots | H04N 21/44222 |

* cited by examiner

*Primary Examiner* — Hsiungfei Peng
(74) *Attorney, Agent, or Firm* — Chip Law Group

(57) ABSTRACT

An electronic device and method for personalization of curated offerings of a media application is provided. The electronic device selects a user interface (UI) element from a set of UI elements on a UI displayed on a display device based on a first user input. The selected UI element is associated with a media application accessible via the electronic device. The electronic device controls the display device to display a callout window within proximity of the selected UI element and within a display area of the UI based on the selection of the UI element. The electronic device selects a set of curated offerings of the media application based on user information and presentation metadata associated with the selected UI element and further controls the display device to populate the displayed callout window with a set of user-engageable items linked to the selected set of curated offerings.

17 Claims, 8 Drawing Sheets

PERSONALIZATION OF CURATED OFFERINGS OF MEDIA APPLICATIONS

CROSS-REFERENCE TO RELATED APPLICATIONS/INCORPORATION BY REFERENCE

None.

FIELD

Various embodiments of the disclosure relate to smart display devices and interactive user interfaces for the smart display devices. More specifically, various embodiments of the disclosure relate to an electronic device and method for personalization of curated offerings of media applications.

BACKGROUND

Smart display devices, especially smart TVs, have evolved to include applications which may be accessed through tiles or icons arranged on screen in a grid or in a sequence. When looking at a selection of tiles or icons that represent available applications or content offered by the applications, a user may typically launch an application to access content and spend time searching for what is of interest. In a Video-on-Demand (VOD) application, for example, a user may spend several minutes looking through a random series of brief content descriptors for each content source and may still be uncertain of what choices to make, even if the tiles are designated as "newly released" programming in a special section as found in popular streaming apps.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for personalization of curated offerings of media applications is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
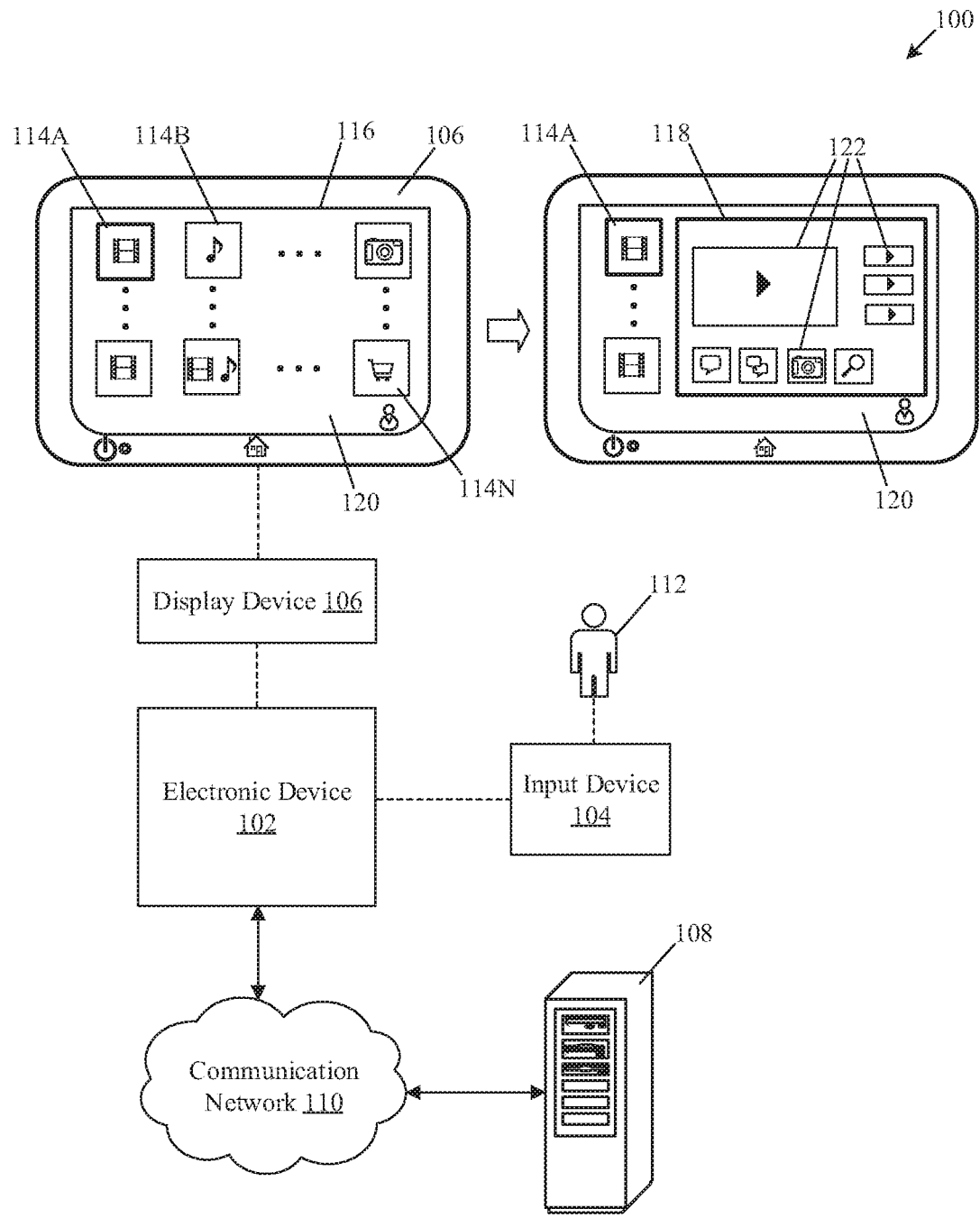
FIG. 1 is a diagram that illustrates an exemplary network environment for personalization of curated offerings of a media application, in accordance with an embodiment of the disclosure.

The following described implementations may be found in the disclosed electronic device and method for personalization of curated offerings of a media application. Exemplary aspects of the disclosure provide an electronic device (for example, a smart television) which control a display device to render a UI that includes UI elements as interactive tiles. Each UI element may be associated with a presentation metadata (e.g., in the form of JavaScript code). On the UI, the UI elements may be initially inactive. When a focus or a user selection is made for a UI element, the UI element may be activated. Once activated, the electronic device determines a media application that the user may be currently focused on, types of offerings of the media application, and user information, such as user's most recent activities using the electronic device or the media application.

These UI elements in the form of interactive tiles can be managed by the content owner, application creator, or a broadcaster to supply curated content. It can also be managed by the electronic device or personalized by the user. For example, the user can check off what functions the user wants the UI element to perform as standard action items, such as to search content when the user presses the right arrow key or to show recent search terms, or past searches. The down arrow, when pressed, can show a view of trending content of the media application or other content related to user's content viewing history. The up arrow, when pressed, can show user's past activity on the media application. All of this may be enabled by XML files or the presentation metadata tied to the UI element. Each UI element may be tagged with an identifier (ID) and each ID may have its own stored presentation metadata, which can be combined with live metadata from a cloud server.

Activation of the UI element may occur automatically by simply highlighting the UI element for an on screen focus or by using control functions, such as by hard pressing down on a remote control "select" key and holding it down for a number of seconds while a focus is on the UI element. When activated, the UI element may change its color to indicate a change of state or may shine a different color around the edge. When activated, a callout window may be displayed on the UI within a proximity of the UI element and within a display area of the UI. The callout window may be populated with various options in the form of user-engageable items (such as video players, thumbnails, carousels, stats bars, or tables) so as to extend a viewing area around the activated (or selected) UI element. For example, a callout window may load to the right of the UI element when a right arrow key is pressed on a remote controller in the active state of the UI element. The callout window may list curated offerings of the media application through the user-engageable items, such as a recommendation pane to select recommended videos of the media application, to invite or join a chat session, explore an offer, or watch trending content of the media application.

The curated offerings may be selected for the user based on the presentation metadata associated with the UI element and/or user information, such as user activity data or user preference data. The selection of the curated offerings may also depend on recent activities of the user on the electronic device. For example, if the user watches movies, movie choices may be presented as content related to what the user recently watched on the callout window. The callout window may also allow the user to show actions (prioritized by contextual information stored in a personal profile or recent activity data), such as, to chat while watching the movie, to respond to a coupon offer, or to respond to an advertisement on the callout window. This user activity data may be extracted based on implementation of Automatic Content Recognition (ACR) for recent programming content or advertisement watched, historical actions recorded when interacting with the UI, search logs, or cookies (which keep a track of views last shown on the callout window and/or the UI). While the callout window may be displayed alongside the UI element as an extended viewing screen, the user may be allowed to easily access and go through personalized and curated offerings of the media application and select what the user may most likely want to watch or interact with.

In contrast, a conventional UI, such as of a conventional smart TV UI, uses tiles or icons as entry points to monolithic applications that run in a walled garden. The monolithic applications are designed to be completely walled off experiences from the rest of content and are typically presented in a sequence where the user goes from one view to the next. Switching back and forth through successive viewing screens may cause the user to lose track of where the user is in the application or to back out like in a website or hit the home key to start over.

Each UI element may bring real time updates associated with a type of content that may be served by the media application associated with the UI element. For example, if the UI element is for a Final Four College Basketball app from a TV network, the callout window for Final Four College Basketball app may directly provide game stats, such as live scores, or tournament brackets. With the UI element as an interactive tile that displays the callout window when activated, the user may be able to explore and engage with viewing options for curated offerings of the media application, without ever launching the media application or entering inside the media application.

The foregoing summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

FIG. 1 is a diagram that illustrates an exemplary network environment for a personalization of curated offerings of a media application, in accordance with an embodiment of the disclosure. With reference to FIG. 1, there is shown a diagram of a network environment 100. The network environment 100 includes an electronic device 102, an input device 104, a display device 106, and a server 108. The electronic device 102 may be communicatively coupled to the server 108, via a communication network 110. Also, the input device 104 and the display device 106 may be communicatively coupled to the electronic device 102, via an input/output (I/O) interface or a network interface of the electronic device 102. In the network environment 100, there is shown a user 112 who may be associated with the input device 104 and the electronic device 102.

In FIG. 1, the electronic device 102 and the display device 106 are shown as two separate devices; however, in some embodiments, the entire functionality of the display device 106 may be included in the electronic device 102, without a deviation from scope of the disclosure.

The electronic device 102 may include suitable logic, circuitry, and interfaces that may be configured to present a set of User Interface (UI) elements 114A, 114B . . . 114N as smart tiles or interactive tiles (e.g., interactive on-screen menu items, interactive icons, or interactive thumbnails) on a UI 116 displayed on the display device 106. Each UI element may be associated with a media application, for example, a broadcaster application or a Video-On-Demand (VOD) application on the electronic device 102. Alternatively, in some embodiments, at least one UI element may indicate curated offerings of at least one media application. As the user 112 may interact with or select one of the set of UI elements 114A, 114B . . . 114N, the electronic device 102 may be responsible for managing the interactivity, responsive behavior, and presentation of a callout window 118 for the selected UI element 114A based on user information and presentation metadata associated with the selected UI element 114A. For example, the presentation metadata may describe the interactivity, the responsive behavior, and content to include in the callout window 118 for the selected UI element 114A.

In an exemplary embodiment, the electronic device 102 may be a display-enabled media player and the display device 106 may be included in the electronic device 102. Examples of such an implementation of the electronic device 102 may include, but are not limited to, a smart television (TV), an Internet-Protocol TV (IPTV), a smartphone, a personal computer, a laptop, a tablet, a wearable electronic device, or any other display device with a capability to receive, decode, and play content encapsulated in broadcasting signals from cable or satellite networks, over-the-air broadcast, or internet-based communication signals.

In another exemplary embodiment, the electronic device 102 may be an Internet-based media player that may be configured to communicate with the display device 106, via a wired or a wireless connection. Examples of such an implementation of the electronic device 102 may include, but are not limited to, a digital media player (DMP), a micro-console, a TV tuner, an ATSC3.0 tuner, a set-top-box, an Over-the-Top (OTT) player, a digital media streamer, a media extender/regulator, a digital media hub, a computer workstation, a mainframe computer, a handheld computer, a mobile phone, a wearable display device, a laptop, a smart appliance, and/or any other computing device with content streaming and playback functionality.

The input device 104 may include suitable logic, circuitry, and interfaces that may be configured to receive user actions(s) and share the received user actions(s) with the electronic device 102. For example, the input device 104 may include a directional-pad (also referred to as a D-pad). With every key-press on the D-pad, a user action may be recorded and shared with the electronic device 102. The user action may be converted to a user input, such as, for navigating menu items or for selection of one or more UI elements from the set of UI elements 114A, 114B . . . 114N. The input device 104 may be configured to communicate with the electronic device 102, via a suitable communication protocol. Examples of the implementation of the input device 104 may include, but are not limited to, a micro-console, a smartphone, a smart remote, a TV remote, a smart speaker, or a wearable electronic device.

The display device 106 may include suitable logic, circuitry, and interfaces that may be configured to display the UI 116 that includes the set of UI elements 114A, 114B . . . 114N in a display area 120 of the UI 116. In at least one embodiment, the display device 106 may include a touch screen which may enable the user 112 to provide user input(s) directly via the touch screen. The display device 106 may be realized through several known technologies such as, but not limited to, at least one of a Liquid Crystal Display (LCD) display, a Light Emitting Diode (LED) display, a plasma display, or an Organic LED (OLED) display technology, or other display devices. In at least one embodiment, the display device 106 may refer to a display unit of a smart TV, a head mounted device (HMD), a smart-glass device, a see-through display, a heads-up-display (HUD), an in-vehicle infotainment system, a projection-based display, an electro-chromic display, or a transparent display.

The server 108 may include suitable logic, circuitry, and interfaces that may be configured to store user information and/or presentation metadata associated with one or more media applications on the electronic device 102. The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102 as two separate entities. In certain embodiments, the functionalities of the server 108 can be incorporated in its entirety or at least partially in the electronic device 102, without a departure from the scope of the disclosure.

The communication network 110 may include a communication medium through which the electronic device 102, the input device 104, the display device 106, and the server 108 may communicate with each other. The communication network 110 may be a wired or wireless communication network. Examples of the communication network 110 may include, but are not limited to, Internet, a Wireless Fidelity (Wi-Fi) network, a Personal Area Network (PAN), a Local Area Network (LAN), or a Metropolitan Area Network (MAN).

Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may control the display device 106 to display the UI 116. The UI 116 may be, for example, an on-screen menu, a home page of a media application on the electronic device 102, a start screen, a landing page of a web application, a content catalogue page, an application launch interface, or a TV menu. The UI 116 may be configured to display graphical and/or non-graphical elements, such as the set of UI elements 114A, 114B . . . 114N and/or other menu items as user-selectable options to access curated offerings of one or more media applications on the electronic device 102.

The set of UI elements 114A, 114B . . . 114N may be associated with one or more media applications installed on the electronic device 102 or accessible via the electronic device 102. Examples of a media application may include, but are not limited to, a media streaming application, a broadcaster application, a VOD application, a video editing application, a chat application, a social media application, a gaming application, or a multimedia application which include one or more of: a gaming feature, a social networking feature, a chat feature, or an audio/video streaming service.

Each UI element of the set of UI elements 114A, 114B . . . 114N may be of a suitable shape, size, or appearance. For example, the UI 116 may be a TV menu and each of the set of UI elements 114A, 114B . . . 114N may be an interactive tile that may be configured to display a graphic as an identifier of a corresponding media application. By way of example, and not limitation, the displayed graphic may be one of: a static icon, a live or internet-updated graphic, a logo, a static thumbnail, a video thumbnail, or a carousel tile.

The set of UI elements 114A, 114B . . . 114N may be arranged on the UI 116 in one of: a grid-pattern or a progressive liner series. For example, each UI element may be arranged in a two dimensional (2D) grid cell of a 2D grid-based menu (i.e. the UI 116) or in a progression of horizontally or vertically scrollable tiles. At any time-instant, if the user 112 intends to select one of a set of curated offerings of a media application, the user 112 may provide a first user input for a selection of the UI element 114A from the set of UI elements 114A, 114B . . . 114N to the electronic device 102. For example, the first user input may be provided via the D-pad of the input device 104. The input device 104 may share the first user input with the electronic device 102.

The electronic device 102 may select the UI element 114A based on the received first user input. Such a selection may activate the UI element 114A, which may be initially in an inactive state. For example, as an interactive tile, the selected UI element 114A may be activated automatically when the UI element 114A is highlighted or brought under an on-screen focus on the UI 116. Additionally, or alternatively, the selected UI element 114A may be activated by using control functions, such as by hard pressing down on a remote control's "select" key and holding it down for a number of seconds while the focus is on the UI element 114A. When activated, the UI element 114A may change its color or other appearance attributes to indicate a change of state. Once the UI element 114A is in the active state, it may show a different color around its edge to provider the user 112, a feedback that active state is set to 'ON'. In at least one embodiment, the UI element 114A may also bounce or move to show the change of state. The UI element 114A may use associated programmed logic (e.g., JSON-based logic or XML-based logic) to identify when the on-screen highlight or screen focus is on the UI element 114A, which may then trigger expanded functions associated with the UI element 114A, as described herein.

The electronic device 102 may control the display device 106 to display the callout window 118 based on the selection of the UI element 114A. When the UI element 114A is activated, the callout window 118 may be displayed in proximity of the selected UI element 114A and within the display area 120 of the UI 116.

The electronic device 102 may select a set of curated offerings of the media applications for the user 112 of the electronic device 102. In at least one embodiment, the selected set of curated offerings may include one or more of: a set of user-consumable offerings and/or a set of action-based offerings. For example, the set of user-consumable offerings may include new content recommendations, context-based content recommendations, advertisements, a list of recently viewed content, a summary of recent user activities on the media application, statistical information associated with at least one topic-of-interest, and the like. Similarly, the set of action-based offerings may include content items with interactive overlays, call-to-action items, an in-app commenting platform, an in-app social networking application, an in-app messaging application, an in-app search platform, an in-app chat-based application, and the like.

The set of curated offerings may be selected based on user information, as described herein. The user information may be collected by the electronic device 102 and may include user activity data and/or user preference data. The user activity data may include a content viewing history, a usage log of the media application, user's search history for the media application, a first set of historical user interactions with one or more past offerings of the media application, and a second set of historical user interactions with user-engageable items (such as thumbnails clicks, ad impressions, or reading content descriptions) for the one or more past offerings. The user preference data may include likes and dislikes for content categories associated with the media application. For example, the selected UI element 114A may be associated with a VOD application that may provide a set of movies of different genres as curated offerings. The electronic device 102 may determine user's historical interactions with the VOD application, such as a number of times the user 112 may have selected movies, watched movies, searched, or socially interacted with movies of the action genre as compared to movies of any other genre.

Additionally, or alternatively, the set of curated offerings may be selected based on the presentation metadata associated the UI element 114A. Information specified in the presentation metadata may be used to control appearance, size, or position of the selected UI element 114A on the UI 116. Also, the presentation metadata may be used to control a responsive behavior, interactivity, or animation effects associated with the selected UI element 114A, when activated, based on the first user input or subsequent user inputs. As the presentation metadata can be created, edited, or updated at any time by an admin of the media application, an admin of the electronic device 102, or an offering provider, the selection of the set of curated offerings and/or a set of user-engageable items 122 for the selected set of curated offerings can be set through configurable lists. More specifically, the admin of the media application, the admin of the electronic device 102, or the offering provider can at any time specify the set of curated offerings that should be offered via the callout window 118 and the set of user-engageable items 122 that should be displayed for the selected set of curated offerings, by updating the configurable lists in the presentation metadata.

The presentation metadata may be received when a client-side interface of the media application is accessed or installed on the electronic device 102. By way of example, and not limitation, the presentation metadata may include one or more of: a database that includes all curated offerings of the media application, a configurable layout of a set of user-engageable items 122 on the callout window 118, or a set of executable API calls. The set of executable API calls may be for at least one curated offering of the set of curated offerings. Additionally, or alternatively, the presentation metadata may include a first configurable list that includes links to the set of curated offerings of the media application for the user 112 and a second configurable list that includes the set of user-engageable items 122 for the set of curated offerings. Additionally, or alternatively, the presentation metadata may include a set of effects, such as transition effects or animation effects for the selected UI element 114A.

The electronic device 102 may further control the display device 106 to populate the displayed callout window 118 with the set of user-engageable items 122, which may be linked to the selected set of curated offerings. The set of user-engageable items 122 may be selected based on the user information or the presentation metadata associated with the selected UI element 114A. For example, the set of user-engageable items 122 may include one or more of: in-app clickable thumbnails, content preview windows, video players, playable thumbnails, image/video carousels, slideshows, tiles, link previews, clickable grid cards, dynamic or static tables, or Graphical UI elements integrated with the set of action-based offerings. For example, the callout window 118 may load to the right of the selected UI element (e.g., when pressing the right arrow key in the active state) and may be populated with the set of user-engageable items 122. Using the set of user-engageable items 122, the user 112 may be able to select one or more of the set of curated offerings of the media application, such as, to select recommended videos of the media application, invite a chat session, join an ongoing chat session, explore an offer or advertised product or service offering of the media application, or watch trending or content related to recent user activity on the media application.

It should be noted that the position, the orientation, the arrangement, the shape, or other presentation attributes of each UI element and each user-engageable item is merely provided as an example in FIG. 1 and should not be construed as limiting for the disclosure. The present disclosure may be also applicable to other positions, orientations, arrangements, shape, or other presentation attributes of UI elements and user-engageable items, without a deviation from the scope of the disclosure.

Modifications, additions, or omissions may be made to FIG. 1 without departing from the scope of the present disclosure. For example, the network environment 100 may include more or fewer elements than those illustrated and described in the present disclosure. In some embodiments, the network environment 100 may include the electronic device 102 but not the input device 104.

Figure 2:
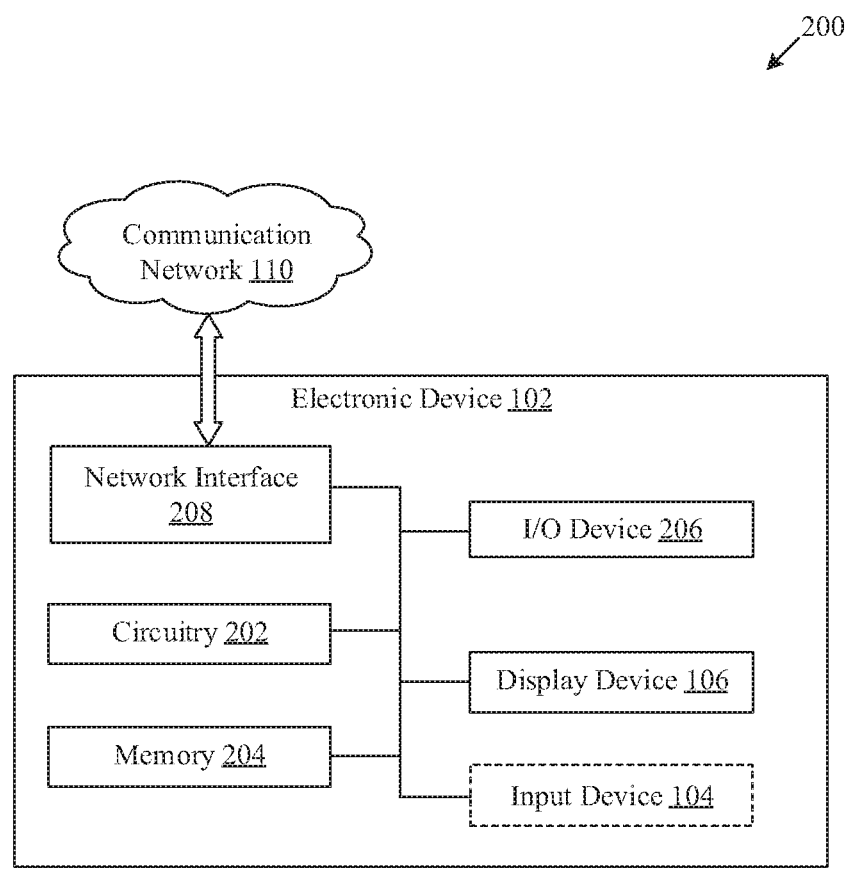
FIG. 2 is a block diagram that illustrates an exemplary electronic device for personalization of curated offerings of a media application, in accordance with an embodiment of the disclosure.

FIG. 2 is a block diagram that illustrates an exemplary electronic device for personalization of curated offerings of a media application, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. In at least one embodiment, the electronic device 102 may also include the display device 106. The circuitry 202 may be communicatively coupled to the memory 204, the I/O device 206, the network interface 208, the input device 104, and the display device 106.

The circuitry 202 may include suitable logic, circuitry, and interfaces that may be configured to execute program instructions associated with different operations to be executed by the electronic device 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and interfaces that may be configured to store the program instructions to be executed by the circuitry 202. In at least one embodiment, the memory 204 may store the presentation metadata associated with each UI element of the set of UI elements 114A, 114B . . . 114N and files associated with one or more media applications installed on the electronic device 102 or accessible via the electronic device 102. The memory 204 may also store the user information associated with each media application installed or accessible on the electronic device 102. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. The I/O device 206 which includes various input and output devices, may be configured to communicate with the circuitry 202. Examples of the I/O device 206 may include, but are not limited to, a touch screen, a keyboard, a mouse, a joystick, a microphone, a display device (such as the display device 106), and a speaker.

The network interface 208 may include suitable logic, circuitry, and interfaces that may be configured to facilitate a communication between the circuitry 202 and the server 108, via the communication network 110. The network interface 208 may be implemented by use of various known technologies to support wired or wireless communication of the electronic device 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the electronic device 102, as described in FIG. 1, may be performed by the circuitry 202. Operations executed by the circuitry 202 are described in detail, for example, in FIGS. 3, 4A, 4B, 5A, and 5B.

Figure 3:
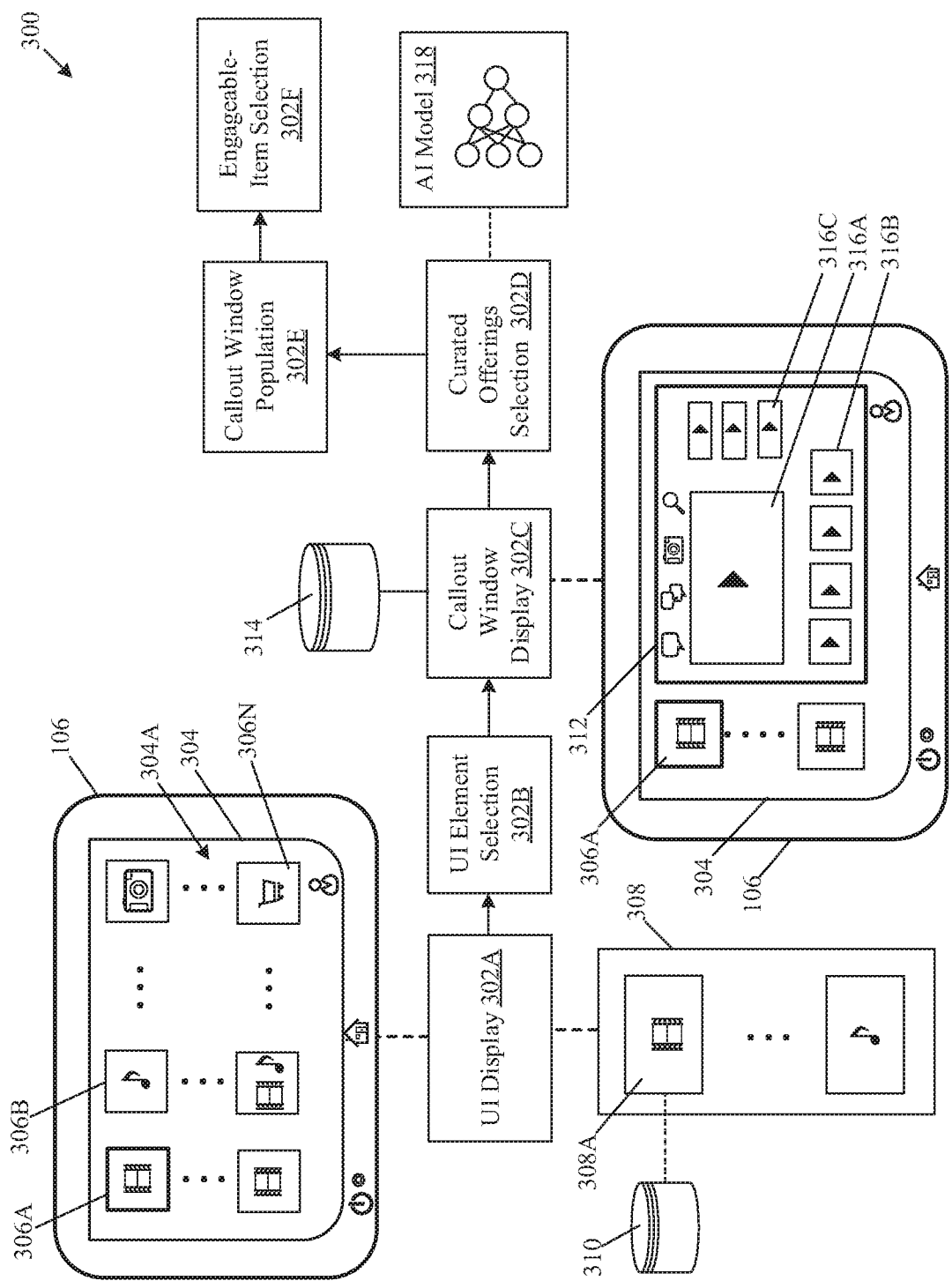
FIG. 3 is a diagram that illustrates exemplary operations for personalization of curated offerings of a media application, in accordance with an embodiment of the disclosure.

FIG. 3 is a diagram that illustrates exemplary operations for personalization of curated offerings of a media application, in accordance with an embodiment of the disclosure. FIG. 3 is explained in conjunction with elements from FIG. 1 and FIG. 2. With reference to FIG. 3, there is shown a block diagram 300 that illustrates exemplary operations from 302A to 302F, as described herein. The exemplary operations illustrated in the block diagram 300 may start at 302A and may be performed by any computing system, apparatus, or device, such as by the electronic device 102 of FIG. 1 or FIG. 2. Although illustrated with discrete blocks, the exemplary operations associated with one or more blocks of the block diagram 300 may be divided into additional blocks, combined into fewer blocks, or eliminated, depending on the particular implementation.

At 302A, a UI 304 may be displayed. The circuitry 202 may control the display device 106 to display the UI 304. The UI 304 may include a set of UI elements 306A, 306B . . . 306N associated with one or more media applications 308 that may be installed on the electronic device 102 or accessible via the electronic device 102. Examples of such media applications may include, but are not limited to, a media streaming application, a broadcaster application, a VOD application, a video editing application, a chat application, a social media application, a gaming application, or a multimedia application which includes one or more of: a gaming feature, a social media feature, a chat feature, or an audio/video streaming service.

Figure 4A:
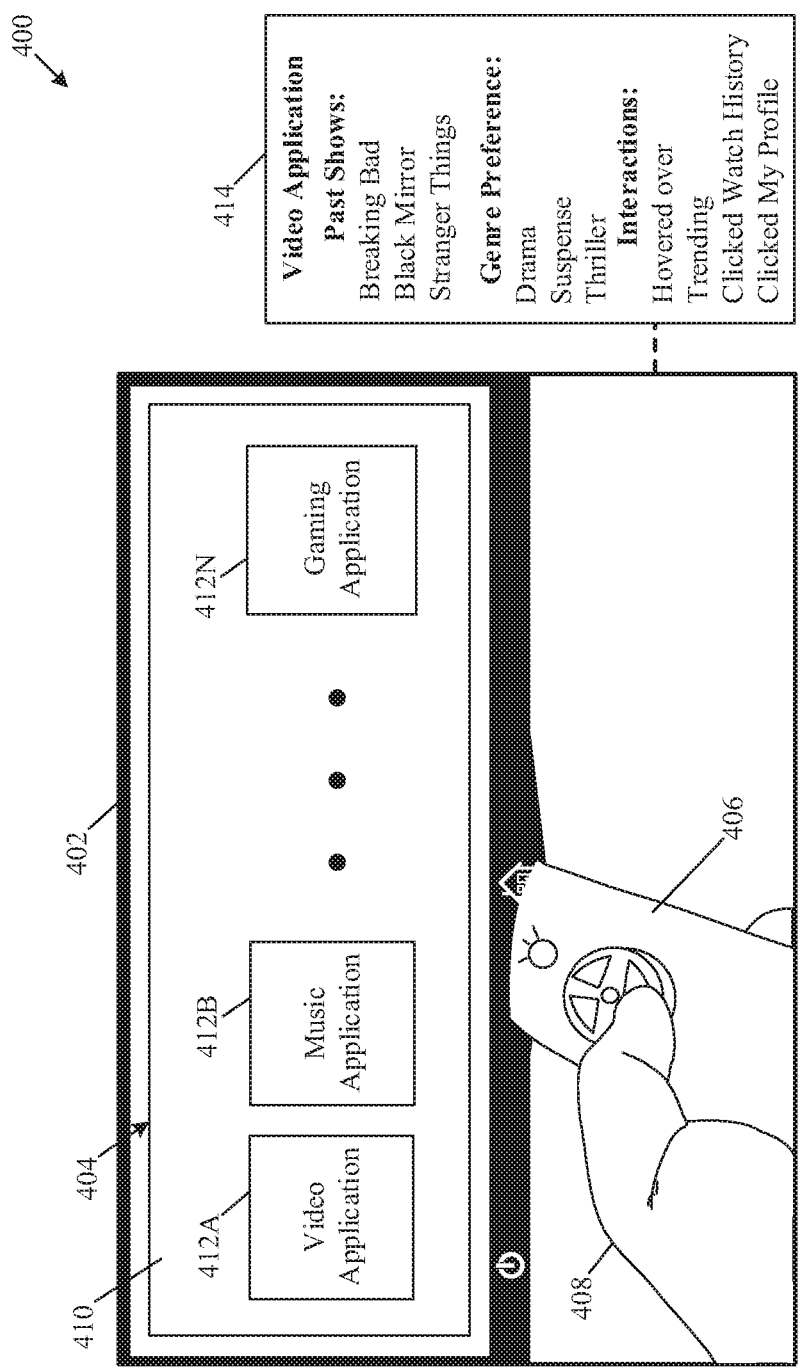
FIGS. 4A and 4B are diagrams that collectively depict an exemplary scenario for personalization of curated offerings of a media application, in accordance with an embodiment of the disclosure.
Figure 4B:
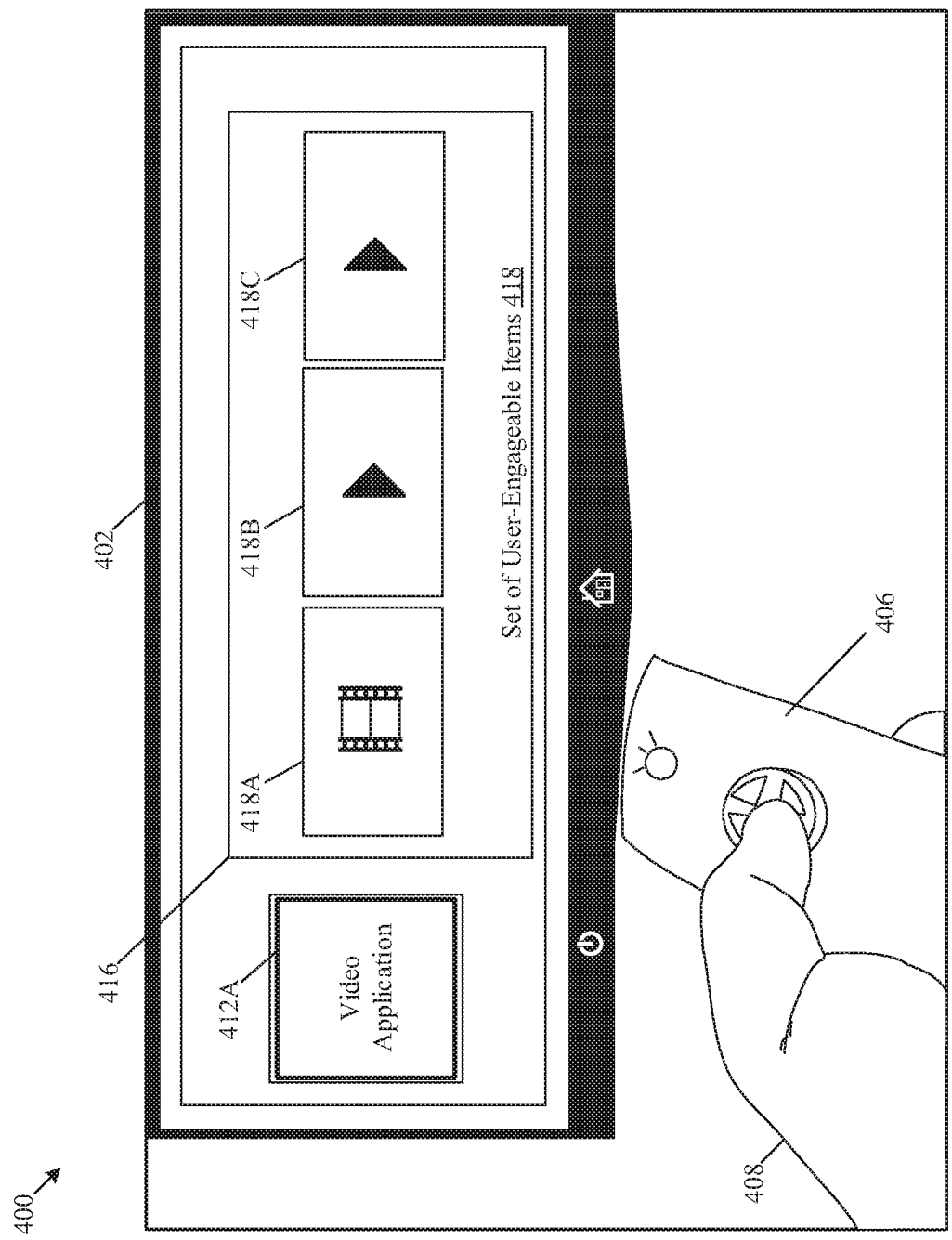

The UI 304 may be displayed as part of or as an on-screen menu and may provide an interface where the one or more media applications 308 and/or curated offerings of the one or more media applications 308 can be listed so that the user 112 can select one of the one or more media applications 308. For example, in cases where the electronic device 102 is a smart TV, the UI 304 may be a TV menu or an interactive programming guide and may display the set of UI elements 306A, 306B . . . 306N as programmed or interactive tiles. Each of such programmed tiles may be associated with a presentation metadata 310 and may display a graphic, such as a logo or another trademark as an identifier of an associated media application or a curated offering, such as an image, a cover, or a label of one of the TV shows that the associated media application may be streaming at that time-instant. On the UI 304, the circuitry 202 may arrange the set of UI elements 306A, 306B . . . 306N in one of: a grid-pattern or a progressive linear series (as shown in FIG. 4A and FIG. 4B, for example).

While the set of UI elements 306A, 306B . . . 306N is rendered as a group of interactive tiles on the UI 304, each UI element may be assigned a programmed logic (for example, JavaScript logic) in the form of the presentation metadata 310, which may be created or updated at any time by the admin of an associated media application, the admin of the electronic device 102, or the offering provider (such as a content creator, advertiser, etc.). Each UI element may seek out and read associated metadata structures in the presentation metadata 310 to determine how the respective UI element can be used.

At 302B, a UI element selection may be performed. For the UI element selection, the circuitry 202 may receive a first user input from the input device 104. The first user input may correspond to a selection of a UI element 306A from the set of UI elements 306A, 306B . . . 306N displayed on the UI 304 of the display device 106. Based on the received first user input, the circuitry 202 may select the UI element 306A from the set of UI elements 306A, 306B . . . 306N. The UI element 306A may be associated with a media application 308A installed on the electronic device 102 or accessible via the electronic device 102. In some embodiments, the selected UI element 306A may be initially in an inactive state and after the selection, the selected UI element 306A may transition to an active state. During the transition, the circuitry 202 may apply a transition effect on the selected UI element 306A. For example, the transition effect may be one or more of a fade effect, a blind effect, a bounce effect, a clip effect, a drop effect, an explode effect, a fold effect, a highlight effect, a pulsate effect, a scale effect, a shake effect, a resize effect, a slide effect, a transfer effect, or other known effects.

By way of example, and not limitation, the selected UI element 306A may be activated automatically when the user 112 uses the input device 104 to simply highlight the UI element 306A or uses control functions of the input device 104, such as by a hard press on a "select" key of the input device 104 for a number of seconds. When selected, the UI element 306A may change its color or other appearance attributes (shape, size, transparency, etc.) to indicate a change of state. Once the selected UI element 306A is in the active state, the selected UI element 306A may shine a different color around its edge to give the user 112 a feedback that the active state is set to 'ON'. The selected UI element 306A may also bounce or move to show the change of state. As the set of UI elements 306A, 306B . . . 306N are associated with JavaScript or other suitable logic, the selected UI element 306A may be able to detect when an on-screen highlight or a screen focus is placed on it, which may then trigger the expanded functions, as described herein.

At 302C, a callout window 312 may be displayed based on the selection of the UI element 306A. The circuitry 202 may control the display device 106 to display the callout window 312 within a proximity of the selected UI element 306A and within a display area 304A of the UI 304 displayed on the display device 106. The callout window 312 may be displayed next to the selected UI element 306A within the UI 304 while the UI 304 remains in background.

In at least one embodiment, once the UI element 306A is selected, the circuitry 202 may wait for another user input to determine if the user 112 wants to access expanded functions (e.g., to load the callout window 312) of the media application 308A associated with the selected UI element 306A. For instance, the user 112 may press one of the selection keys on the input device 104 to provide a second user input, which may be received by the circuitry 202. Based on the second user input, the circuitry 202 may control the display device 106 to display the callout window 312 within the proximity of the selected UI element 306A and within the display area 304A of the UI 304.

At 302D, curated offerings of the media application 308A may be selected. The circuitry 202 may select a set of curated offerings of the media application 308A for the user 112. The set of curated offerings may include one or more of: a set of user consumable offerings and/or a set of action-based offerings. For example, the set of user consumable offerings may include new content recommendations (TV programs, video-based or audio-based programs (such as podcasts), etc.), context-based content recommendations, advertisements, a list of recently viewed content, a summary of recent user activities on the media application 308A, or statistical information associated with at least one topic-of-interest (for example, related sports, music, news, etc.). The set of action-based offerings may be items or content with which the user 112 can interact in the callout window 312 and may include, for example, content items with interactive overlays, call-to-action items, an in-app commenting platform, an in-app social networking application, an in-app messaging application, an in-app search platform, or an in-app chat-based application.

The set of curated offerings may be selected based on user information 314. In one embodiment, the circuitry 202 may collect the user information 314 which may include user activity data and user preference data. The user activity data may correspond to current as well as past activities of the user 112 on the electronic device 102. For example, the user activity data may include a content viewing history, a usage log of the media application 308A, user's search history for the media application 308A, a first set of historical user interactions with one or more past offerings of the media application 308A, and a second set of historical user interactions with a set of user-engageable items 316 for the one or more past offerings of the media application 308A. Similarly, the user preference data may correspond to a set of preferences (for example likes and dislikes of content categories) of the user 112 for different offerings of the media application 308A. For example, the user preference data may be created based on the user activity data, such as by identifying types of offerings and associated categories which may most likely be of interest to the user 112 based on historical user activities, including search queries, content views, likes, dislikes, social media footprints, clicks, purchases, impressions, and the like.

As an example, if the user 112 regularly watches a live stream of a TV show "X" on a media application "A", then the content category or genre tags of the TV show "X" may be included in the user preference data. In some embodiments, the circuitry 202 may determine types of content that the media application 308A may offer as curated offerings of the media application 308A. Such a determination may be done based on the techniques, such as Contents Recognition (CR) or based on metadata included in Advanced Television Systems Committee (ATSC 3.0) signals for content broadcasts. For example, if the media application 308A offers news content and movies, the circuitry 202 may determine whether the user 112 watches the news or the movies and may generate the user preference data based on a type of content that the user 112 frequently watches on the media application 308A.

Additionally, or alternatively, the set of curated offerings may be selected based on the presentation metadata 310 associated with the selected UI element, as described herein. Information specified in the presentation metadata 310 may be used to control appearance, size, or position of the selected UI element 306A on the UI 304. Also, the presentation metadata 310 may be used to control a responsive behavior, interactivity, or animation effects associated with the selected UI element 306A when activated based on the first user input or subsequent user inputs.

As the presentation metadata 310 can be created, edited, or updated at any time by an admin of the media application 308A, an admin of the electronic device 102, or an offering provider, the selection of the set of curated offerings and/or the set of user-engageable items 316 for the set of curated offerings can be set through configurable lists. More specifically, the admin of the media application 308A, the admin of the electronic device 102, or the offering provider can at any time specify the set of curated offerings that should be offered via the callout window 312 and the set of user-engageable items 316 that should be displayed as engageable selection options for the selected set of curated offerings by updating configurable lists of the presentation metadata 310.

In accordance with the embodiment, the circuitry 202 may receive an input from one or more of: the admin of the electronic device 102, the admin of the media application 308A or the offering provider. The offering provider may be an entity which published offering(s) on the media application 308A. For example, the offering provider may be an advertiser network that publishes ads or a content creator that publishes programming content on the media application 308A. The received input may include metadata information associated with the selected UI element 306A of the media application 308A. The circuitry 202 may generate the presentation metadata 310 based on the metadata information in the input. The presentation metadata 310 may be updated regularly (for example, weekly or daily) based on new inputs from one or more of: the admin of the electronic device 102, the admin of the media application 308A, or the offering provider. By updating the presentation metadata 310, the admin of the media application 308A, the admin of the electronic device 102, or the offering provider may be able to control what the user 112 sees first on the displayed callout window 312 when the callout window 312 loads within the display area 304A of the UI 304.

The presentation metadata 310 may be received in an Extensible Markup Language (XML) or JavaScript Object Notation (JSON) format when a client-end interface of the media application 308A is installed or accessed on the electronic device 102. By way of example, and not limitation, the presentation metadata 310 may include one or more of: a database that includes all curated offerings of the media application 308A, a configurable layout of the set of user-engageable items 316 on the callout window 312, or a set of executable API calls. When specified, these executable API calls may integrate functionalities of third party ($3^{rd}$) applications on the callout window 312. Examples of such functionalities may include, but are not limited to, a social media post, a commenting platform, an interface of a chat application, or an ability to stream program/content of a $3^{rd}$ party application. Additionally, or alternatively, the presentation metadata 310 may include a first configurable list that includes links to the set of curated offerings of the media application 308A and a second configurable list that includes a set of user-engageable items 316 for the set of curated offerings. The set of executable API calls may be for at least one curated offering of the set of curated offerings specified in the links of the first configurable list. Additionally, or alternatively, the presentation metadata 310 may include a set of effects, such as transition effects or animation effects for the selected UI element 306A. At times, by updating the presentation metadata 310, the admin of the media application 308A, the admin of the electronic device 102, or the offering provider may update one or more of: the database of all the curated offerings of the media application 308A, the configurable layout of user-engageable items on the callout window 312, the set of executable API calls, the first configurable list, or the second configurable list.

By way of example, and not limitation, if the media application 308A is a VOD application, the database of curated offerings may include video-based programs, which may be categorized for the user 112 into recommended programs, location-specific programs (e.g., news), language-specific programs (based on user's language preference), genre-specific programs, and the like. The first configurable list may include links to a set of recommended videos, context-specific ads, or recently viewed content, as the user preference data may indicate that the user 112 prefers to watch the set of recommended videos. The second configurable list may contain the set of user-engageable items 316, for example, a set of video-based thumbnails for the set of recommended videos, a popup for the context-specific ads, a chat box window in which the user 112 may discuss or share views on viewed content, and a set of thumbnails for the recently viewed content. The configurable layout may provide information about the layout of the set of user-engageable items 316 on the callout window 312. The set of executable API calls may allow the media application 308A to integrate functionalities and/or application interfaces of $3^{rd}$ party applications on the callout window 312. For example, if the VOD application allows the user 112 to login to a $3^{rd}$ party social media application to access a comment or a chat-based platform of the social media application on the callout window 312, the media application 308A may link an executable API call to a social-media log in button, which when selected, will use authenticated user credentials to access the comment or the chat-based platform of the social media application on the callout window 312. When selected, the social-media log in button (i.e. a user-engageable item) may trigger the executable API call to an API endpoint associated with a server of the social media application.

An exemplary embodiment for Artificial Intelligence (AI)-based selection of the set of curated offerings is described herein. The circuitry 202 may extract, from the user information 314 or the presentation metadata 310, one or more data points associated with the user 112. For example, a data point ($D_1$) may include a log of user activity between 9:00 PM to 12:00 AM for a two week period. The circuitry 202 may input the extracted one or more data points to an AI model 318. By way of example, and not limitation, the AI model 318 may be a neural network-based classifier and may be trained to identify a relationship between inputs and class labels (or outputs). The AI model 318 may be defined by its hyper-parameters, for example, a number of weights, a cost function, an input size, a number of layers, or a neural network topology. The hyper-parameters of the AI model 318 may be tuned before or during training and weights may be updated during the training to achieve a global minima of a cost function. After several epochs of training on the inputs of a training dataset, the AI model 318 may be trained to output a prediction/classification result for new unseen inputs.

The AI model 318 may include electronic data, which may be implemented, for example, as a software component, and may rely on code databases, libraries, external scripts, or other logic or instructions for execution by a processing device, such as, by the circuitry 202 of the electronic device 102. The AI model 318 may include code and routines configured to enable a computing device, such as circuitry 202 to perform one or more operations for classification of one or more inputs into class labels. Additionally, or alternatively, the AI model 318 may be implemented using hardware including a processor, a microprocessor (e.g., to perform or control performance of one or more operations), a field-programmable gate array (FPGA), or an application-specific integrated circuit (ASIC). Alternatively, in some embodiments, the AI model 318 may be implemented using a combination of hardware and software.

The circuitry 202 may receive an AI-based recommendation as output of the AI model 318 for the input that includes the extracted one or more data points. The AI-based recommendation may include one or more curated offerings of the media application 308A as a recommendation for the user 112. For example, in case of $D_1$ as input, the AI-based recommendation may include a likelihood score assigned to a group of curated offerings of the media application 308A. A high likelihood score for a TV show (A) may indicate that the user 112 may most likely prefer to watch the TV show (A) between 9:00 PM and 12:00 AM. The circuitry 202 may control the display device 106 to select the set of curated offerings for the user 112 further based on the received AI based recommendation.

By way of an example, and not limitation, the media application 308A may be a hybrid application that may include a shopping service, a gaming service, and a VOD streaming service. The circuitry 202 may provide user's search history for the media application 308A of last two weeks as an input to the AI model 318. The circuitry 202 may receive an AI-based recommendation that may include a poker game and a video program (A) as suitable recommendations for the user 112. In such an instance, the poker game and the video program (A) may be included in the selected set of curated offerings for the user 112.

Another exemplary embodiment for AI-based selection of the set of curated offerings is described herein. The circuitry 202 may extract a set of data points from the user information 314, which may include a content viewing history and past content recommendations for the user 112. The circuitry 202 may input the extracted set of data points to the AI model 318 and may receive an AI-based analysis as an output of the AI model 318 for the input. The AI based analysis for the user 112 may include likes and dislikes for content categories associated with the media application 308A. Based on the received AI-based analysis, the set of curated offerings may be selected for the user 112.

By way of example, and not limitation, the media application 308A may be a VOD application that may have audio/video content related to different genres, for example "action", "comedy", "romance", or a combination thereof. The user 112 may have watched videos related to "action" and "comedy" in past. The circuitry 202 may extract data points that include the content viewing history (i.e. for "action" and "comedy" genres) and past content recommendations. These extracted data points may be provided as an input to the AI model 318. The AI model 318 may generate an AI-based analysis that may include likes and dislikes of the user 112. The likes may include content or shows related to "action" and "comedy" genre and the dislikes may include shows related to the "romance" genre. The set of curated offerings for the user 112 may be selected further based on the AI-based analysis that includes the likes and the dislikes of the user 112.

At 302E, the displayed callout window 312 may be populated. The circuitry 202 may control the display device 106 to populate the displayed callout window 312 with the set of user-engageable items 316, which may be linked to the selected set of curated offerings. The set of user-engageable items 316 may include, for example, in-app clickable thumbnails, content preview windows, video players, playable thumbnails, image/video carousels, slideshows, tiles, link previews, clickable grid cards, dynamic or static tables, Graphical UI elements integrated with a set of action-based offerings, and the like. As an example, the set of user-engageable items 316 may include a first user-engageable item 316A as a video player linked to a new episode of TV program, a second user-engageable item 316B as a set of in-app clickable thumbnails for past episodes of the TV program, and a third user-engageable item 316C as a recommendation window that includes in-app clickable thumbnails linked to episodes of other TV programs which may be contextually related to the TV program, user preferences, or user activities. Example scenarios associated with callout windows are described in FIGS. 4A, 4B, 5A, and 5B.

In at least one embodiment, the circuitry 202 may also determine a presentation attribute for each user-engageable item of the set of user-engageable items 316. The presentation attribute may control a position of each user-engageable item on the callout window 312, appearance, size, a display template (such as, from one of a thumbnail, a video-thumbnail, a video player, a carousel, or a list), or transition effects for each user-engageable item. The presentation attribute may be applicable for each user-engageable item before, on, or after a user selection is made. Such determination may be done based on the presentation metadata 310 associated with the media application 308A or the user information 314. Based on such determination, the displayed callout window 312 may be populated with the set of user-engageable items 316.

At 302F, user-engageable item selection may be performed. For such selection, the circuitry 202 may receive a third user input via the input device 104. The circuitry 202 may select the first user-engageable item 316A from the set of user-engageable items 316 based on the received third user input. The first user-engageable item 316A may be linked to a curated offering of the selected set of curated offerings. Once selected, the circuitry 202 may control the display device 106 to present the curated offering onto the displayed callout window 312. Alternatively, in some embodiments, the circuitry 202 may control the display device 106 to load an application UI associated with the curated offering and may present the curated offering onto the application UI.

By way of example, and not limitation, the selected first user-engageable item 316A may be an in-app clickable carousel of photos, which may be used as a medium to advertise new or upcoming video-based programs, affiliate products, or services. The carousel of the photos may be linked to one or more of the set of curated offerings selected for the user 112 of the media application 308A.

By way of another example, and not limitation, the selected first user-engageable item 316A may be a Graphical UI (GUI) element integrated with an action-based offering, such as an advertisement of a product on sale or an invite for a chat session in relation to a live broadcast of live programming content on the displayed callout window 312. When the user 112 selects the first user-engageable item 316A, the circuitry 202 may control the display device 106 to display the application UI to access and/or interact with the selected action-based offering.

FIGS. 4A and 4B are diagrams that collectively depict an exemplary scenario for personalization of curated offerings of a media application, in accordance with an embodiment of the disclosure. FIG. 4A and FIG. 4B are explained in conjunction with elements from FIGS. 1, 2, and 3. With reference to FIGS. 4A and 4B, there is shown an exemplary scenario 400. In the exemplary scenario 400, there is shown a smart TV 402, which may be an exemplary implementation of the electronic device 102 of FIG. 1 or FIG. 2. There is further shown a display panel 404 as an exemplary implementation of the display device 106, and a remote controller 406 as an exemplary implementation of the input device 104. There is further shown a user 408 who is holding the remote controller 406 in front of the smart TV 402.

The circuitry 202 may control the smart TV 402 to display a UI 410 on the display panel 404 on the smart TV 402. The UI 410 may include a set of UI elements, such as a UI element 412A, a second UI element 412B and an Nth UI element 412N. Each of the set of UI elements may be associated with one or more media applications that may be accessible on the smart TV 402. As shown, for example, the UI element 412A may be associated with video application, as a VOD application (such as Netflix™, Amazon Prime Video™, or YouTube™) or a broadcaster application (such as CBS™ or ABC™). The second UI element 412B may be associated with a music application (such as Spotify™, Amazon Music™, or Apple Music™). Similarly, the Nth UI element 412N may be associated with a gaming application.

When the user selects a key on the D-pad of the remote controller 406, the remote controller 406 may share the selection of the key as a first user input to the circuitry 202 of the smart TV 402. At any time-instant, the circuitry 202 may receive the first user input via the remote controller 406 and select the UI element 412A based on the received first user input. Once selected, the state of the UI element 412A may change from an inactive state to an active state. For the transition, the circuitry 202 may apply a transition effect or an animation effect on the UI element 412A to provide the user 408, with a feedback indicative of the selection of the UI element 412A. For example, the UI element 412A may bounce up or may change its color to provide the feedback.

In some embodiments, the circuitry 202 may also collect user information 414 (as shown), which may include user activity data and user preference data for video application associated with the selected UI element 412A. As shown, for example, the user information 414 may include data points, which may indicate that the user may have watched shows, such as "Breaking Bad©", "Black Mirror©", or "Stranger Things©" previously on the video application associated with the selected UI element 406A. Also, such data points may include genre preferences, such as "Drama", "Suspense", and "Thriller" or interactions, such as a log of impressions for previously recommended programs or trending content, a click stream, a watch history, or a log of ad impressions.

At any time-instant after the first user input, a second user input may be received by the circuitry 202 via the remote controller 406. The second user input may correspond to a request to display a callout window 416. The circuitry 202 may receive the second user input and may control the display panel 404 to display the callout window 416 in response to the received second user input. Thereafter, the circuitry 202 may select a set of curated offerings of the video application based on the collected user information 414 and the presentation metadata (as described in FIG. 1 and FIG. 3, for example). The selected set of curated offerings may include new content recommendations for ongoing or upcoming episodes of a TV show or movies and context-based recommendations for episodes of a show that may be contextually related to the watch history of the user.

The circuitry 202 may control the display panel 404 to populate the displayed callout window 416 with a set of user-engageable items 418, such as a first user-engageable item 418A, a second user-engageable item 418B, and a third user-engageable item 418C. The set of user-engageable items 418 may include in-app clickable thumbnails and content preview windows. In at least one embodiment, the circuitry 202 may determine a presentation attribute for each user-engageable item of the set of user-engageable items 418. The presentation attribute for each of user-engageable item may be based on the collected user information 414 or the presentation metadata associated with the video application. As an example, the presentation attribute may specify the location of a user-engageable item on the callout window 416 when the set of user-engageable items 418 is populated on the callout window 416. For example, based on the collected user information 414, it may be determined that the user prefers to watch period drama shows as compared to contemporary drama shows. As a result, the circuitry 202 may place a user-engageable item (which may be linked to a "period drama") at a position (such as left center or top left) so that it may be easy for the user to select the period drama for playback on the smart TV 402. In such a case, the first user-engageable item 418A may be an in-app clickable thumbnail that may be linked to a context-based recommendation for the period drama show. The second user-engageable item 418B and the third user-engageable item 418C may be content preview windows that may be linked to a world war 2 documentary and a docuseries on American Independence, respectively.

Figure 5A:
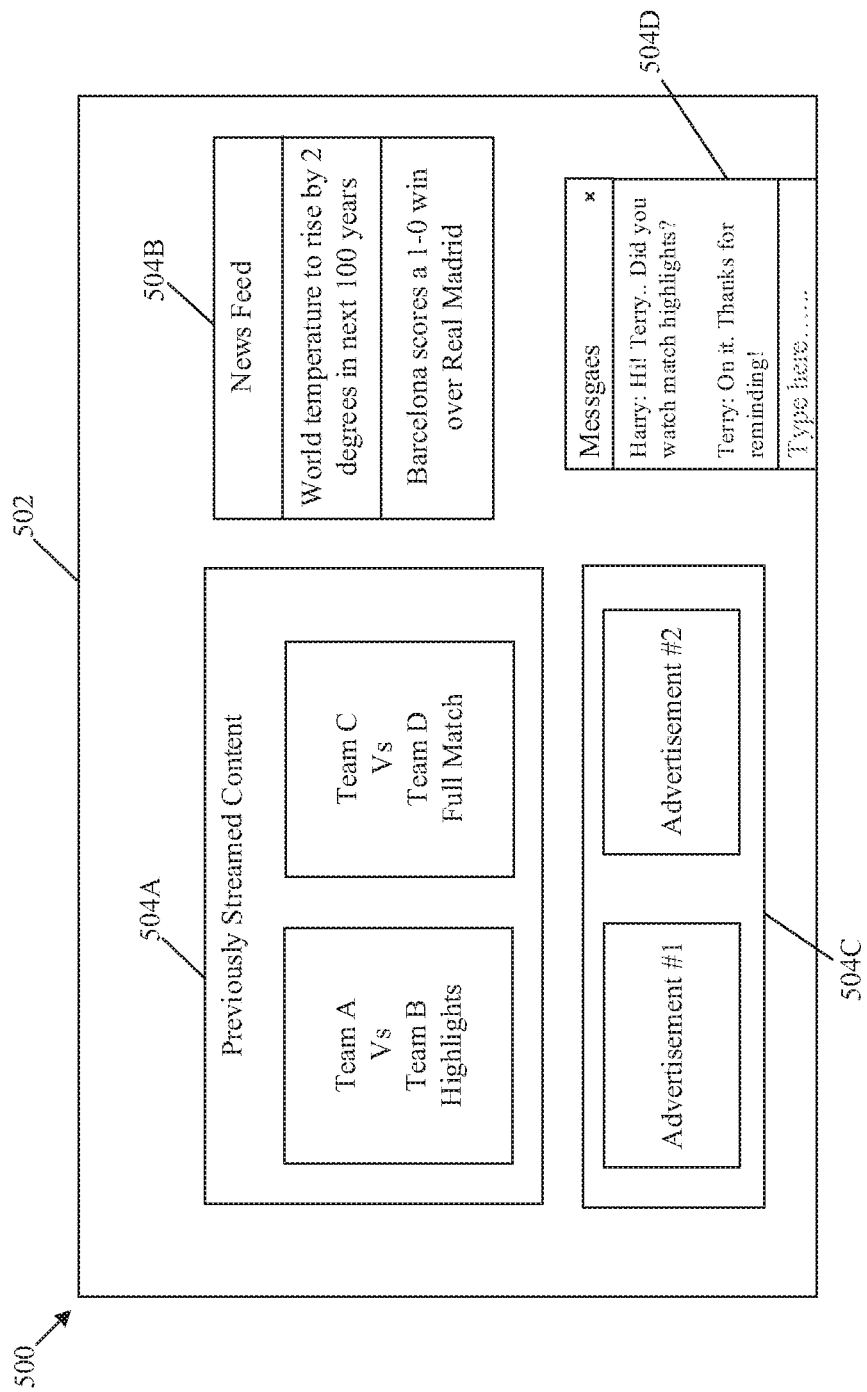
FIGS. 5A and 5B are diagrams that collectively illustrate an exemplary scenario for populating a callout window with user-engageable items and presenting curated offerings on the callout window, in accordance with an embodiment of the disclosure.
Figure 5B:
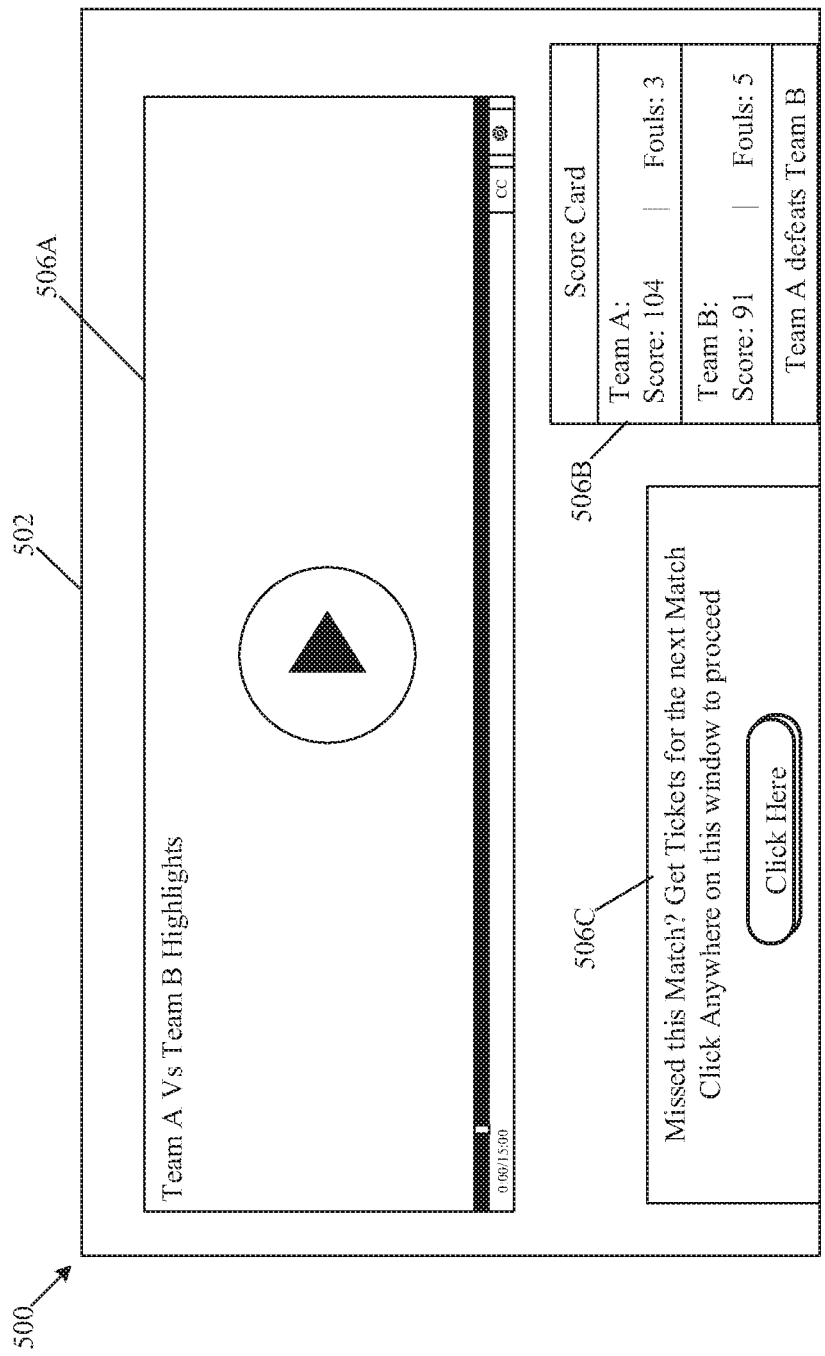

FIGS. 5A and 5B are diagrams that collectively illustrate an exemplary scenario for populating a callout window with user-engageable items and presenting curated offerings on the callout window, in accordance with an embodiment of the disclosure. FIGS. 5A and 5B are explained in conjunction with elements from FIGS. 1, 2, 3, 4A, and 4B. With reference to FIGS. 5A and 5B, there is shown an exemplary scenario 500. In the exemplary scenario 500, there is shown a callout window 502 that may be populated with a set of user-engageable items. The set of user-engageable items may be one or more of: in-app clickable thumbnails, content preview windows, video players, playable thumbnails, image/video carousels, slideshows, tiles, link previews, clickable grid cards, dynamic or static tables, or Graphical UI elements integrated with a set of action-based offerings.

Each of set of user-engageable items may be linked to a curated offering of a set of curated offering, such as new content recommendations, context-based content recommendations, advertisements, a list of recently viewed content, a summary of recent user activities on the media application, or statistical information associated with at least one topic-of-interest. As shown, for example, the set of user-engageable items may include a first user-engageable item 504A, a second user-engageable item 504B, a third user-engageable item 504C, and a fourth user-engageable item 504D. The first user-engageable item 504A may be linked to previously streamed content, such as "Team A versus Team B Highlights" and "Team C versus Team D Full Match". The first user-engageable item 504A may include in-app clickable thumbnails for the previously streamed content on the callout window 502. The second user-engageable item 504B may be linked to statistical information, such as a news feed associated with sports and climate science as two topics of interest. As shown, for example, the second user-engageable item 504B may preview a short clip of news content on the callout window 502. Similarly, the third user-engageable item 504C may be linked to an action-based offering, such as an advertisement #1 and an advertisement #2, and may be populated with link previews for the advertisement #1 and the advertisement #2 on the callout window 502. The fourth user-engageable item 504D may be linked to another action-based offering, such as a chat application and may include a chat window of the chat application.

At any time-instant, the circuitry 202 may receive a user input from the user 112 via the input device 104. The user input may correspond to a selection of a first user-engageable item 504A from the set of user-engageable items. In response, the circuitry 202 may present the curated offering "Team A versus Team B Highlights", linked to the selected first user-engageable item 504A, on the callout window 502. Additionally, the circuitry 202 may control the display device to populate the callout window 502 with a new set of user-engageable items. The new set of user-engageable items may include a user-engageable item 506A that may be a video player for playback of the curated offering "Team A versus Team B Highlights", a user-engageable item 506B that may be a content preview window to show a Score Card of the match between the "Team A" and "Team B", and a user-engageable item 506C that may include link previews to purchase tickets for next match between "Team A" and "Team B". The user-engageable item 506A may play the highlights of the match between "Team A" and "Team B".

In an embodiment, the circuitry 202 may receive another user input via the input device 104 for the selection of the third new user-engageable item 506C. The third new user-engageable item 506C may contain a web link to a ticket selling application that may be accessible via the electronic device 102. In such an embodiment, the circuitry 202 may control the display device to load a UI the ticket selling application and may allow the user 112 to purchase the ticket for the next match between "Team A" and "Team B".

Figure 6:
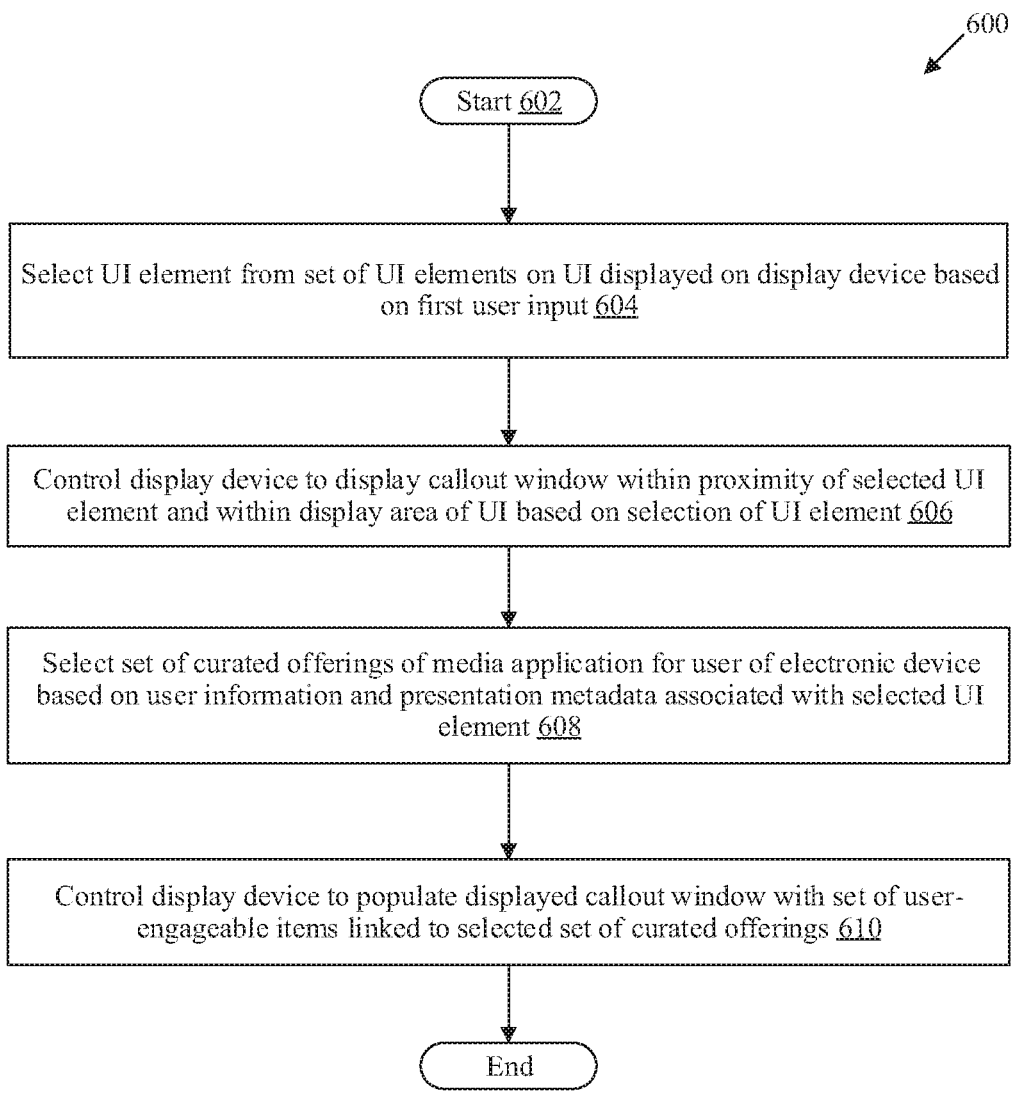
FIG. 6 is a flowchart that illustrates exemplary operations for personalization of curated offerings of a media application, in accordance with an embodiment of the disclosure.

FIG. 6 is a flowchart that illustrates exemplary operations for personalization of curated offerings of a media application, in accordance with an embodiment of the disclosure. FIG. 6 is explained in conjunction with elements from FIGS. 1, 2, 3, 4A, 4B, 5A, and 5B. With reference to FIG. 6, there is shown a flowchart 600. The operations from 602 to 610 may be implemented by any computing system, such as by the electronic device 102 of FIG. 1 or FIG. 2. The operations may start at 602 and may proceed to 604.

At 604, a UI element 114A may be selected from the set of UI elements 114A, 114B . . . 114N on the UI 116 of the display device 106. The UI element 114A may be selected based on a first user input and may be associated with a media application accessible via the electronic device 102. In at least one embodiment, the circuitry 202 may be configured to select the UI element 114A from the set of UI elements 114A, 114B . . . 114N based on first user input.

At 606, the display device 106 may be controlled to display the callout window 118 within proximity of the selected UI element 114A and within the display area 120 of the UI 116. The display device 106 may be controlled to display the callout window 118 based on the selection of the UI element 114A. In at least one embodiment, the circuitry 202 may be configured to control the display device 106 to display the callout window 118 within the proximity to the selected UI element 114A and within the display area 120 of the UI 116 based on the selection of the UI element 114A.

At 608, a set of curated offerings of the media application for the user 112 of the electronic device 102 may be selected. The set of curated offerings may be selected based on user information and presentation metadata associated with the selected UI element 114A. In at least one embodiment, the circuitry 202 may be configured to select the set of curated offerings of the media application for the user 112 based on the user information and the presentation metadata associated with media application.

At 610, the display device 106 may be controlled to populate the callout window 118 with a set of user-engageable items 122 linked to the selected set of curated offerings. In at least one embodiment, the circuitry 202 may be configured to control the display device 106 to populate the displayed callout window 118 with the set of user-engageable items 122 linked to the selected set of curated offerings. Control may pass to end.

Various embodiments of the disclosure may provide a non-transitory computer readable medium and/or storage medium having stored thereon, instructions executable by a machine and/or a computer to operate an electronic device. The instructions may cause the machine and/or computer to perform operations that include selecting a user interface (UI) element from a set of UI elements on a UI displayed on a display device based on a first user input. The selected UI element may be associated with a media application accessible via the electronic device. The operations may further include controlling the display device to display a callout window within proximity of the selected UI element based on the selection of the first UI element. The callout window may be within a display area of the UI. The operations may further include selecting a set of curated offerings of the media application for a user of the electronic device based on the user information and presentation metadata associated with the selected UI element. The operations may further include controlling the display device to populate the displayed callout window with a set of user-engageable items linked to the selected set of curated offerings.

Exemplary aspects of the disclosure may include an electronic device (such as the electronic device 102 of FIG. 1) that includes circuitry (such as the circuitry 202) that may be communicatively coupled to a display device (such as the display device 106 of FIG. 1). The circuitry may be configured to select a UI element (such as the UI element 114A) from a set of UI elements (such as the set of UI element 114A, 114B . . . 114N) on a UI (such as the UI 116) displayed on the display device based on a first user input. The selected UI element may be associated with a media application (such as the video application of FIG. 5) accessible via the electronic device. Based on the selection of the UI element, the circuitry be configured to control the display device to display a callout window (such as the callout window 118) within proximity of the selected UI element and within a display area (such as the display area 120) of the UI. The circuitry may be further configured to select a set of curated offerings of the media application for a user (such as the user 112) of the electronic device based on user information and presentation metadata (such as the presentation metadata 310) associated with the selected UI element. Thereafter, the circuitry may be configured to control the display device to populate the displayed callout window with a set of user-engageable items (such as the set of user-engageable items 122) linked to the selected set of curated offerings.

In accordance with an embodiment, the circuitry may be configured to control the display device to display the UI that include the set of UI elements associated with one or more media applications accessible via the electronic device. For example, the UI may be a TV menu and each UI element of the set of UI elements may be an interactive tile that may be configured to display a graphic as an identifier of the media application. In at least one embodiment, the circuitry may be configured to arrange the set of UI elements on the UI in one of a grid-pattern or a progressive linear series.

In accordance with an embodiment, the electronic device may further include an input device (such as the input device 104) communicatively coupled to the display device and the circuitry. The circuitry may be configured to receive the first user input via the input device.

In accordance with an embodiment, the circuitry may be further configured to receive a second user input via the input device and control the display device to display the callout window further based on the received second user input.

In accordance with an embodiment, the circuitry may be further configured to receive an input from one of: an admin of the media application, an admin of the electronic device, or an offering provider. The presentation metadata may be generated based on the received input. In accordance with an embodiment, the presentation metadata may include one or more of a database of curated offerings of the media application a first configurable list that includes links to the set of curated offerings of the media application for the user, a second configurable list that includes the set of user-engageable items for the set of curated offerings, or a configurable layout of the set of user-engageable items on the callout window. Additionally, the presentation metadata may include one or more of: a set of executable API calls for at least one curated offering of the set of curated offerings or a set of effects that includes transition effects or animation effects for the UI element.

In accordance with an embodiment, the circuitry may be further configured to collect the user information which includes user activity data and user preference data. The user activity data may include a content viewing history, a usage log of the media application, user's search history for the media application, a first set of historical user interactions with at least one past offering of the media application, and a second set of historical user interactions with user-engageable items for the at least one past offering. In accordance with an embodiment, the circuitry may be further configured to determine a presentation attribute for each user-engageable item of the set of user-engageable items based on the collected user information or the presentation metadata associated with the selected UI element.

In accordance with an embodiment, the circuitry may be further configured to extract, from the user information and the presentation metadata, at least one data point associated with the user. The extracted at least one data point may be provided as an input to an AI model (such as the AI model 318). The circuitry may be configured to receive an AI-based recommendation as an output of the AI model for the input. The AI-based recommendation may include at least one curated offering of the media application. In at least one embodiment, the set of curated offerings for the user may be selected further based on the received AI-based recommendation.

In accordance with an embodiment, the circuitry may be configured to extract a set of data points from the user information that includes a content viewing history and past content recommendations. The extracted set of data points may be provided as input to the AI model, the circuitry may be configured to receive an AI-based analysis as an output of the AI model for the input. The AI-based analysis for the user may include likes and dislikes for content categories associated with the media application. In at least one embodiment, the set of curation offerings for the user may be selected further based on the received AI-based analysis.

In accordance with an embodiment, the selected set of curated offerings may include one or more of: a set of user-consumable offerings and a set of action-based offerings. The set of user-consumable offerings may include new content recommendations, context-based content recommendations, advertisements, a list of recently viewed content, a summary of recent user activities on the media application, or statistical information associated with at least one topic-of-interest. Similarly, the set of action-based offerings may include content items with interactive overlays, call-to-action items, an in-app commenting platform, an in-app social networking application, an in-app messaging application, an in-app search platform, or an in-app chat-based application.

In accordance with an embodiment, the set of user-engageable items may include one or more of: in-app clickable thumbnails, content preview windows, video players, playable thumbnails, image/video carousels, slideshows, tiles, link previews, clickable grid cards, dynamic or static tables, or Graphical UI elements integrated with a set of action-based offerings.

In accordance with an embodiment, the circuitry may be further configured to select a user-engageable item (such as the first user-engageable item 316A) from the set of user-engageable items on the callout window based on a third user input. The selected user-engageable item may be linked to a curated offering of the selected set of curated offerings. The circuitry may be further configured to control the display device to present the curated offering onto one of: the callout window or an application UI of the media application.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
 circuitry communicatively coupled to a display device, wherein the circuitry is configured to:
  select a User Interface (UI) element from a set of UI elements on a UI displayed on the display device, wherein
   the UI element is selected based on a first user input, and
   the selected UI element is associated with a media application accessible via the electronic device;
  control, based on the selection of the UI element, the display device to display a callout window within proximity of the selected UI element and within a display area of the UI;
  extract, from user information of a user and presentation metadata associated with the selected UI element, at least one data point associated with the user;
  input the extracted at least one data point to a trained Artificial Intelligence (AI) model;
  receive, based on the input of the extracted at least one data point, an AI-based recommendation as a first output of the AI model;
  select a set of curated offerings of the media application for the user of the electronic device based on the AI-based recommendation, wherein
   the AI-based recommendation comprises at least one curated offering of the set of curated offerings of the media application, and
   the user information comprises user activity data and user preference data associated with the media application;
  determine a presentation attribute for each user-engageable item of a first set of user-engageable items based on the user information associated with the media application, wherein
   the first set of user-engageable items is linked to the selected set of curated offerings of the media application; and
  control the display device to display the first set of user-engageable items in the displayed callout window, wherein the first set of user-engageable items is displayed in the callout window based on the determined presentation attribute.

2. The electronic device according to claim 1, wherein the circuitry is further configured to control the display device to display the UI comprising the set of UI elements associated with at least one media application accessible via the electronic device.

3. The electronic device according to claim 1, wherein
 the UI is a television menu, and
 each UI element of the set of UI elements is an interactive tile that is configured to display a graphic as an identifier of the media application.

4. The electronic device according to claim 1, wherein the circuitry is further configured to arrange the set of UI elements on the UI in one of a grid-pattern or a progressive linear series.

5. The electronic device according to claim 1, further comprising an input device communicatively coupled to the display device and the circuitry, wherein
 the circuitry is further configured to receive the first user input via the input device.

6. The electronic device according to claim 5, wherein the circuitry is further configured to:
 receive a second user input via the input device; and
 control the display device to display the callout window based on the received second user input.

7. The electronic device according to claim 1, wherein the circuitry is further configured to:
 receive a specific input from at least one of an administrator of the media application, an administrator of the electronic device, or an offering provider; and
 generate the presentation metadata based on the received specific input.

8. The electronic device according to claim 7, wherein the presentation metadata comprises at least one of:
 a database of a plurality of curated offerings of the media application,
 a first configurable list comprising the set of curated offerings of the media application for the user,
 a second configurable list comprising the first set of user-engageable items for the set of curated offerings,
 a configurable layout of the first set of user-engageable items on the callout window,
 a set of executable API calls for at least one curated offering of the set of curated offerings, or
 a set of effects comprising at least one of a set of transition effects or a set of animation effects for the UI element.

9. The electronic device according to claim 1, wherein the user activity data comprises at least one of a content viewing history, a usage log of the media application, user's search history for the media application, a first set of historical user interactions with at least one past offering of the media application, or a second set of historical user interactions with a second set of user-engageable items for the at least one past offering.

10. The electronic device according to claim 1, wherein the circuitry is further configured to:
 extract a set of data points from the user information, wherein the set of data points comprises a content viewing history and past content recommendations;
 input the extracted set of data points to the AI model; and
 receive, based on the input of the extracted set of data points, an AI-based analysis as a second output of the AI model, wherein the AI-based analysis for the user comprises likes and dislikes for content categories associated with the media application.

11. The electronic device according to claim 10, wherein the circuitry is further configured to select the set of curated offerings for the user based on the received AI-based analysis.

12. The electronic device according to claim 1, wherein
 the selected set of curated offerings comprises at least one of a set of user-consumable offerings or a set of action-based offerings,
 the set of user-consumable offerings comprises at least one of advertisements, a list of recently viewed content, a summary of recent user activities on the media application, or statistical information associated with at least one topic-of-interest, and
 the set of action-based offerings comprises at least one of an in-app commenting platform, an in-app social networking application, an in-app messaging application, an in-app search platform, or an in-app chat-based application.

13. The electronic device according to claim 1, wherein the first set of user-engageable items comprises at least one of in-app clickable thumbnails, content preview windows, video players, playable thumbnails, image/video carousels, slideshows, tiles, link previews, clickable grid cards, dynamic or static tables, or Graphical UI elements integrated with a set of action-based offerings.

14. The electronic device according to claim 1, wherein the circuitry is further configured to:
select a user-engageable item from the first set of user-engageable items on the callout window based on a third user input,
wherein the selected user-engageable item is linked to a specific curated offering of the selected set of curated offerings; and
control the display device to present the specific curated offering onto one of the callout window or an application UI of the media application.

15. A method, comprising:
in an electronic device communicatively coupled to a display device:
selecting a User Interface (UI) element from a set of UI elements on a UI displayed on the display device, wherein
the UI element is selected based on a first user input, and
the selected UI element is associated with a media application accessible via the electronic device;
controlling, based on the selection of the UI element, the display device to display a callout window within proximity of the selected UI element and within a display area of the UI;
extracting, from user information of a user and presentation metadata associated with the selected UI element, at least one data point associated with the user;
inputting the extracted at least one data point to a trained Artificial Intelligence (AI) model;
receiving, based on the input of the extracted at least one data point, an AI-based recommendation as a first output of the AI model;
selecting a set of curated offerings of the media application for the user of the electronic device based on the AI-based recommendation, wherein
the AI-based recommendation comprises at least one curated offering of the set of curated offerings of the media application, and
the user information comprises user activity data and user preference data associated with the media application;
determining a presentation attribute for each user-engageable item of a set of user-engageable items based on the user information associated with the media application, wherein
the set of user-engageable items is linked to the selected set of curated offerings of the media application; and
controlling the display device to display the set of user-engageable items in the displayed callout window, wherein the set of user-engageable items is displayed in the callout window based on the determined presentation attribute.

16. A non-transitory computer-readable medium having stored thereon computer implemented instructions that, when executed by a computer in an electronic device, causes the computer in the electronic device to execute operations, the operations comprising:
selecting a User Interface (UI) element from a set of UI elements on a UI displayed on a display device, wherein
the UI element is selected based on a first user input, and
the selected UI element is associated with a media application accessible via the electronic device;
controlling, based on the selection of the UI element, the display device to display a callout window within proximity of the selected UI element and within a display area of the UI;
extracting, from user information of a user and presentation metadata associated with the selected UI element, at least one data point associated with the user;
inputting the extracted at least one data point to a trained Artificial Intelligence (AI) model;
receiving, based on the input of the extracted at least one data point, an AI-based recommendation as a first output of the AI model;
selecting a set of curated offerings of the media application for the user of the electronic device based on the AI-based recommendation, wherein
the AI-based recommendation comprises at least one curated offering of the set of curated offerings of the media application, and
the user information comprises user activity data and user preference data associated with the media application;
determining a presentation attribute for each user-engageable item of a set of user-engageable items based on the user information associated with the media application, wherein
the set of user-engageable items is linked to the selected set of curated offerings of the media application; and
controlling the display device to display the set of user-engageable items in the displayed callout window, wherein the set of user-engageable items is displayed in the callout window based on the determined presentation attribute.

17. An electronic device, comprising:
circuitry communicatively coupled to a display device, wherein the circuitry is configured to:
select a User Interface (UI) element from a set of UI elements on a UI displayed on the display device, wherein
the UI element is selected based on a user input, and
the selected UI element is associated with a media application accessible via the electronic device;
control, based on the selection of the UI element, the display device to display a callout window within proximity of the selected UI element and within a display area of the UI;
extract a set of data points from the user information, wherein the set of data points comprises a content viewing history and past content recommendations;
input the extracted set of data points to an artificial intelligence (AI) model;
receive, based on the input of the extracted set of data points, an AI-based analysis as an output of the AI model, wherein the AI-based analysis for the user comprises likes and dislikes for content categories associated with the media application;
select a set of curated offerings of the media application for the user of the electronic device based on the AI-based analysis, wherein
the AI-based analysis for the user comprises likes and dislikes for content categories associated with the media application, and
the user information comprises user activity data and user preference data associated with the media application;

determine a presentation attribute for each user-engageable item of a set of user-engageable items based on the user information associated with the media application,
 wherein the set of user-engageable items is linked to the selected set of curated offerings of the media application; and
control the display device to display the set of user-engageable items in the displayed callout window, wherein the set of user-engageable items is displayed in the callout window based on the determined presentation attribute.

\* \* \* \* \*